G. A. DOWNS.
FOOD OR MEAT CHOPPER.
APPLICATION FILED AUG. 7, 1913.

1,123,710.

Patented Jan. 5, 1915.

WITNESSES:
Louis Lucia
C. F. Eaton

INVENTOR.
George A. Downs.

BY
H. E. Hart
ATTORNEY.

UNITED STATES PATENT OFFICE.

GEORGE A. DOWNS, OF FORESTVILLE, CONNECTICUT, ASSIGNOR TO LANDERS, FRARY & CLARK, OF NEW BRITAIN, CONNECTICUT, A CORPORATION OF CONNECTICUT.

FOOD OR MEAT CHOPPER.

1,123,710. Specification of Letters Patent. Patented Jan. 5, 1915.

Application filed August 7, 1913. Serial No. 783,478.

*To all whom it may concern:*

Be it known that I, GEORGE A. DOWNS, a citizen of the United States, and a resident of Forestville, in the county of Hartford and State of Connecticut, have invented certain new and useful Improvements in Food or Meat Choppers, of which the following is a specification.

This invention relates generally to that class of devices known as food or meat choppers, and especially to machines designed for heavier work.

In particular the invention is intended to provide a new method of mounting the cutter for driving engagement with the worm to strengthen the construction at this point.

Figure 1:
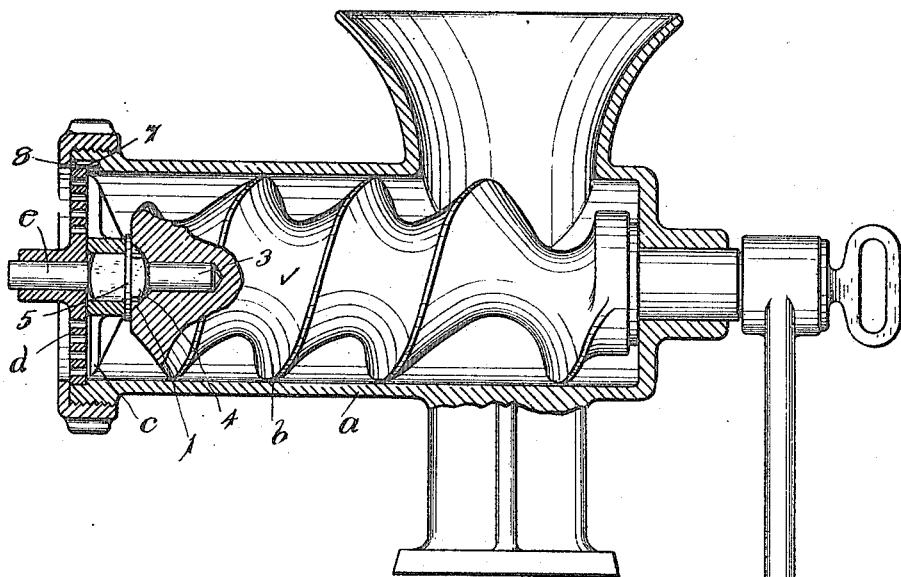
Figure 2:
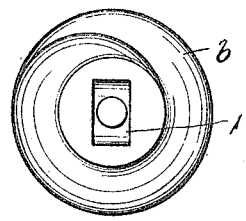
Figure 3:
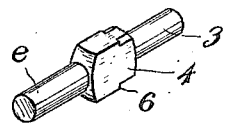

In the drawings, Figure 1 is a side view of a device embodying my invention, shown partly in section. Fig. 2 is an end view of the worm. Fig. 3 is a detailed perspective view of the stud.

Referring to the drawing, *a* denotes the case of the chopper, *b* the worm rotatably mounted therein, *c* the cutter which is mounted on the stud and moves with the worm, *d* the strainer plate which is non-rotatably mounted in the case, and forms a bearing for the end of the stud, *e*, which holds the parts in position. The worm at its rear end has a shoulder abutting against the wall, and a handle stem projecting through this wall of the case, to which a handle or other operating part for the worm may be attached.

In the embodiment of the invention selected for illustration, the end of the worm is slotted as at 1, and drilled axially to form a circular opening. The stud has a round end 3, having a drive fit in the circular opening, a flat sided part 4, fitting the slot 1 and washer 5; shoulders 6 hold the washer in place, and provide a steadying support for the stud. The cutter *c* fits the flat sided part of the stud, causing it to turn with the worm, and the strainer plate *d* fits snugly in the end of the case against the face of the cutter, and is provided with a central hub to receive the outer end of the stud to act as a bearing in which the worm turns. A pin 7 in the case engages a notch 8 in the strainer plate to prevent its rotation.

It is to be understood that there are various ways of interlocking the stud with the worm, such as by broaching a square aperture in place of the described slot, or forming any other irregular recess in which a correspondingly shaped part of the stud could be engaged.

I claim as my invention:—

1. In a device of the character described, the combination with a rotating worm having an axial aperture terminating in a socket of irregular shape at the end of the worm, of a stud fitting in said aperture, and provided with an irregular part shaped to fit said irregular socket and a cutter located against the end of said worm and having an axial opening conforming to the irregular part of said stud for driving engagement therewith.

2. In a device of the character described, the combination with a worm having an axial aperture terminating in a socket of irregular shape at its end and a cutter located against the end of said worm, of a stud fitting in said aperture and provided with a part shaped to fit said irregular socket and provided with driving engagement with said cutter, a washer adapted to fit the irregular part of said stud, and shoulders on the stud overlying said washer.

3. In a device of the character described, a case, and worm rotatably mounted therein, the end of the worm being transversely slotted, and having an axial hole in the bottom of the slot; a stud whose end has a drive fit in the hole, an enlarged part of said stud fitting said slot; a washer fitting said enlarged part; shoulders on said stud overlying said washer; a cutter mounted on the enlarged part of said stud and thereby connected to move with said worm; a strainer plate non-rotatably mounted within the end of the case against the face of said cutter and centrally pierced to receive the outer end of said stud; a cap removably secured to said case and engaging said strainer plate to hold the parts in position.

GEORGE A. DOWNS.

Witnesses:
WILLIAM E. BAKER,
JOSEPH F. LAMB.

Copies of this patent may be obtained for five cents each, by addressing the "Commissioner of Patents, Washington, D. C."